United States Patent
D'Angelo et al.

(10) Patent No.: US 11,214,490 B1
(45) Date of Patent: *Jan. 4, 2022

(54) METHOD OF SCRUBBING SULFUR DIOXIDE FROM WASTE GAS TO PRODUCT POTASSIUM THIOSULFATE

(71) Applicant: Ceres Technology LLC, Davie, FL (US)

(72) Inventors: Francine D'Angelo, Davie, FL (US); Joan Wright Manley, Kilgore, TX (US)

(73) Assignee: Ceres Technology, LLC, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,230

(22) Filed: May 19, 2021

Related U.S. Application Data

(63) Continuation of application No. 17/106,090, filed on Nov. 28, 2020.

(51) Int. Cl.
  *C01B 17/64* (2006.01)
  *B01D 53/18* (2006.01)
  (Continued)

(52) U.S. Cl.
  CPC .......... *C01B 17/64* (2013.01); *B01D 53/1406* (2013.01); *B01D 53/1412* (2013.01);
  (Continued)

(58) Field of Classification Search
  CPC ............ B01D 53/1406; B01D 53/1481; B01D 53/501; B01D 53/502; B01D 53/504;
  (Continued)

(56) References Cited

U.S. PATENT DOCUMENTS

| | | | | |
|---|---|---|---|---|
| 3,948,608 A | * | 4/1976 | Weir, Jr. ............... | B01D 53/501 |
| | | | | 422/169 |
| 4,039,307 A | * | 8/1977 | Bondor .................. | B01D 53/74 |
| | | | | 96/235 |

(Continued)

FOREIGN PATENT DOCUMENTS

EP          0 613 713 A1 * 9/1994 ............. B01D 53/34

*Primary Examiner* — Timothy C Vanoy
(74) *Attorney, Agent, or Firm* — Harbin & Hein PLLC

(57) ABSTRACT

A method of wet-scrubbing a waste gas containing sulfur dioxide ($SO_2$) to produce potassium thiosulfate. The wet-scrubbing facility includes multiple horizontally disposed stages where a preceding stage passes partially-scrubbed waste gas to a succeeding stage. Each stage has a scrubber mechanism to scrub waste gas with circulating fluid that progressively reduces $SO_2$ in the waste gas before atmospheric discharge. The scrubber mechanism may optionally include a packing material to facilitate absorption of $SO_2$ by the fluid, a sump disposed at the output of the stage to receive fluid as it drains from the packing, and a circulation pump to circulate fluid from the sump to its packing and to cascade at least a portion of the fluid back to a preceding stage. A portion of the fluid is extracted and reacted in a reaction vessel with a cation to produce potassium thiosulfate.

20 Claims, 2 Drawing Sheets

(51) Int. Cl.
  *B01D 53/14* (2006.01)
  *B01D 53/34* (2006.01)
  *B01D 53/50* (2006.01)
  *B01D 53/78* (2006.01)
  *B01D 53/96* (2006.01)

(52) U.S. Cl.
  CPC ..... *B01D 53/1481* (2013.01); *B01D 53/1493* (2013.01); *B01D 53/185* (2013.01); *B01D 53/346* (2013.01); *B01D 53/502* (2013.01); *B01D 53/504* (2013.01); *B01D 53/78* (2013.01); *B01D 53/96* (2013.01); *B01D 2251/206* (2013.01); *B01D 2251/306* (2013.01); *B01D 2257/302* (2013.01)

(58) Field of Classification Search
  CPC .............. B01D 53/78; B01D 2251/306; B01D 2251/604; B01D 2257/302; B01D 2258/0283; B01J 10/00; B01J 2219/00306; B01J 2219/182
  See application file for complete search history.

(56) References Cited

U.S. PATENT DOCUMENTS

| | | | |
|---|---|---|---|
| 4,170,546 | A | 10/1979 | Frayer et al. |
| 4,173,528 | A | 11/1979 | Frayer et al. |
| 4,269,812 | A * | 5/1981 | Edwards .............. B01D 53/501 423/243.09 |
| 4,343,771 | A * | 8/1982 | Edwards .............. B01D 53/501 422/168 |
| 4,405,593 | A | 9/1983 | Schlauer et al. |
| 4,481,170 | A * | 11/1984 | Wier, Jr. ................ B01D 47/06 261/118 |
| 6,059,962 | A | 5/2000 | Alexandr et al. |
| 6,733,660 | B2 | 5/2004 | Pradhan et al. |
| 9,884,285 | B2 * | 2/2018 | Kupari ................ B01D 53/504 |
| 9,988,270 | B2 | 6/2018 | Hojjatie et al. |
| 10,472,238 | B2 * | 11/2019 | Hojjatie ........... B01D 53/1481 |
| 2021/0113956 | A1 * | 4/2021 | Northrop ........... B01D 53/1406 |

* cited by examiner

METHOD OF SCRUBBING SULFUR DIOXIDE FROM WASTE GAS TO PRODUCT POTASSIUM THIOSULFATE

CROSS-REFERENCE TO RELATED APPLICATION

This invention is related to U.S. application Ser. No. 17/106,090 filed Nov. 28, 2020 entitled Crossflow Scrubbing Method and Apparatus To Produce a Product Such As Potassium Thiosulfate or Ammonium Sulfate in the name of the same inventors hereof.

BACKGROUND

This invention pertains to a wet scrubbing method and apparatus but, more specifically, to a horizontally disposed multistage crossflow scrubbing method and apparatus to scrub unwanted sulfur dioxide gas from an industrial waste gas source before venting to the atmosphere, while at the same time, producing potassium thiosulfate as a by-product.

Sulfur dioxide pollution may result from crude oil refining, fossil fuel burning, flue-gas desulfurization, mining, waste incineration, sulfur burning operations, cement plants, pulp & paper mills, smelters, glass plants, biomass fired facilities, sulfuric acid plants, Claus plants and many other activities. Deleterious effects of sulfur dioxide ($SO_2$) emissions are minimized by sulfur scrubbers before being discharged into the atmosphere. Typical $SO_2$ scrubbers employ open spray towers that utilize liquid or slurry sprays, e.g., an aqueous bisulfite/sulfite solution, to initiate a first step in the desulfurization process in which sulfur dioxide gas is absorbed into or reacted with the liquid spray. A cation is typically added to the liquid for pH and reaction control. These towers typically employ a series of spray nozzles that spray incoming liquid against the direction of flow of the gas stream where the liquid falls into a sump and is continuously recirculated to the spray nozzles to increase absorption and/or reaction. The liquid in the sump may be siphoned off and reacted with other chemicals to produce a chemical byproduct such as thiosulfate of potassium.

In a typical desulfurization plant, a liquid-to-gas, or L/G, ratio in the spray tower conventionally runs around 120 gallons per minute (gpm) liquid flow per 1,000 actual cubic feet per minute (acfm) gas, which ratio is dependent upon the scrubber type and the concentration of $SO_2$ in the flue gas. Some of these scrubber towers may be equipped with a plastic or metal packing to enhance gas-liquid contact but this imposes certain constraints on plant operation and efficiency such as cooling requirements, scale removal and cleaning, flow restrictions and pressure drop, safety, maintenance and labor costs, etc.

Rather than using a conventional tower (or multistage tower) construction, however, the present invention is directed to a horizontally disposed multistage crossflow scrubbing method and apparatus that efficiently scrubs a gas stream. Exemplary prior art systems and methods include U.S. Pat. Nos. 10,472,238; 6,733,660; 4,408,593 and 4,170,546. As evident by the description below, horizontal scrubbing provides multiple advantages over a tower arrangement.

SUMMARY

In order to remove unwanted $SO_2$ gas from industrial waste gas, a novel aspect of the present invention cascades a streaming waste gas in a forward direction through multiple stages of a crossflow scrubber but cascades the scrubbing liquid backward through the multiple stages while, at the same time, extracting a portion of the liquid to produce potassium thiosulfate. In other words, streaming waste gas moves forward through scrubbing stages and the scrubbing liquid travels in a reverse direction through the scrubbing stages.

In accordance with the invention, there is provided a method of efficiently scrubbing unwanted $SO_2$ gas from a streaming gas source before venting to atmosphere while also producing potassium thiosulfate ($K_2S_2O_3$) wherein the method comprises supplying the streaming gas source to a primary vessel; circulating a liquid solution within the primary vessel in order to react with and partially scrub unwanted $SO_2$ gas from the streaming gas source. The liquid solution comprises at least one of potassium sulfite ($K_2SO_3$) and potassium bisulfite ($KHSO_3$). A multistage crossflow scrubber is provided downstream of the primary vessel, which comprises a group of serially arranged scrubbing mechanisms at respective stages thereof that successively scrub unreacted $SO_2$ gas from the streaming gas source. At least three stages may be provided to efficiently scrub a waste gas source but additional stages may be added for higher scrubbing efficiency.

The crossflow scrubber is operative by (i) receiving and partially scrubbing at a first stage thereof $SO_2$ gas from streaming gas source emanating from the primary vessel, (ii) forwarding the streaming gas source containing unreacted $SO_2$ gas from the first stage to a second succeeding stage, and repeating this process from a preceding stage to a succeeding stage of the crossflow scrubber, (iii) circulating liquid solution within the stages to further scrub the streaming gas source of unwanted $SO_2$ gas, and ultimately (iv) venting to the atmosphere the streaming gas source substantially free of $SO_2$ gas from a final stage of the crossflow scrubber. In addition, at least a portion of liquid solution circulating in stages of the crossflow scrubber is cascaded from a succeeding stage to a preceding stage and optionally, at least a portion of the liquid solution is cascaded back to the primary vessel for further scrubbing the streaming gas source of unwanted $SO_2$ gas.

Then, at least a portion of the circulating liquid solution is extracted and transferred to a reaction vessel along with potassium hydroxide (KOH) in order to produce potassium thiosulfate ($K_2S_2O_3$) in the reaction vessel.

Other aspects of the invention include, in the liquid circulating step, facilitating reaction between $SO_2$ gas and the liquid solution utilizing a gas contacting media within respective stages of the crossflow scrubber; supplying a cation to the liquid solution to control pH during circulation of the liquid solution; adding water to the liquid solution to control or maintain specific gravity of the liquid solution; the transferring step including transferring sulfur along with the potassium hydroxide (KOH) to the reaction vessel; wherein the cation of the supplying step comprises at least one of potassium hydroxide, sodium hydroxide and sodium carbonate to make sodium bisulfite; wherein the gas contacting media comprises a packing material; condensing or adding water to the liquid solution during circulation in order to control specific gravity thereof; controlling temperature of the liquid solution during circulation in order to increase efficiency of reaction; controlling temperature of the liquid solution during circulation in order to protect temperature-sensitive elements; controlling pH of the liquid solution during the circulation; venting unreacted $SO_2$ gas from the multi-section scrubber to atmosphere at an $SO_2$ level below a maximum allowable limit; continuously stirring the liquid solution in the reaction vessel to maintain homogeneity of the liquid solution contained therein; and controlling temperature of the liquid solution in the reaction vessel from about 125 to 250 degrees Fahrenheit in order to control reaction within the liquid solution.

In accordance with yet another aspect of the invention, there is provided a method of wet-scrubbing unwanted $SO_2$ from a streaming gas source before atmospheric venting wherein the scrubbing liquid includes potassium sulfite (K2S03) and/or potassium bisulfite (KHSO3). This method comprises cascading forward the streaming gas source through multiple stages of a multistage wet scrubber while cascading backward the scrubbing liquid through the multiple stages of the multistage wet scrubber and extracting a portion of the scrubbing liquid from the multistage wet scrubber to produce potassium thiosulfate resulting from a reaction between SO2 and the scrubbing liquid. In addition, the method may include controlling the pH and specific gravity of the scrubbing liquid by adding a cation and/or water during circulation of the scrubbing liquid through the multistage wet scrubber. The streaming gas source may emanate from a wet scrubbing tower that partially removes SO2 from the streaming gas source.

In yet a further aspect of the invention, there is provided a method of wet-scrubbing unwanted SO2 from streaming waste gas before atmospheric venting wherein the scrubbing liquid includes potassium sulfite (K2S03) and/or potassium bisulfite (KHSO3). This method comprises streaming the waste gas forward through respective stages of a multistage wet scrubber while reversing the flow of scrubbing liquid through the respective stages of the multistage wet scrubber, and extracting a portion of the scrubbing liquid from the multistage wet scrubber in order to produce potassium thiosulfate (K2S2O3) resulting from a reaction between the scrubbing liquid and the unwanted SO2.

Other aspects and advantages of the invention will become apparent upon review of the following description taken in connection with the accompanying drawings. The invention, though, is pointed out with particularity by the appended claims.

DESCRIPTION OF ILLUSTRATIVE EMBODIMENTS

The illustrated embodiments described below entail production of potassium sulfite and potassium bisulfite from sulfur dioxide gas in order to produce potassium thiosulfate, which is conventionally used as a fertilizer. Three to five scrubber stages should be sufficient to achieve low exhaust gas ppm emission when scrubbing $SO_2$, for example.

It should be noted that rather than producing a thiosulfate fertilizer from SO2 gas directly in tower equipment, potassium sulfite/bisulfite are produced from the $SO_2$ gas as precursors to the production of thiosulfate fertilizers using a cross-flow scrubber. The thiosulfate fertilizer is subsequently produced in a reaction vessel using the precursors along with other chemicals. The $SO_2$-containing gas can come from any type of chemical plant that produces $SO_2$ gas including but not limited to refinery acid gas, Claus Tail gas, sulfur burners, or mining operations.

Figure 1A:
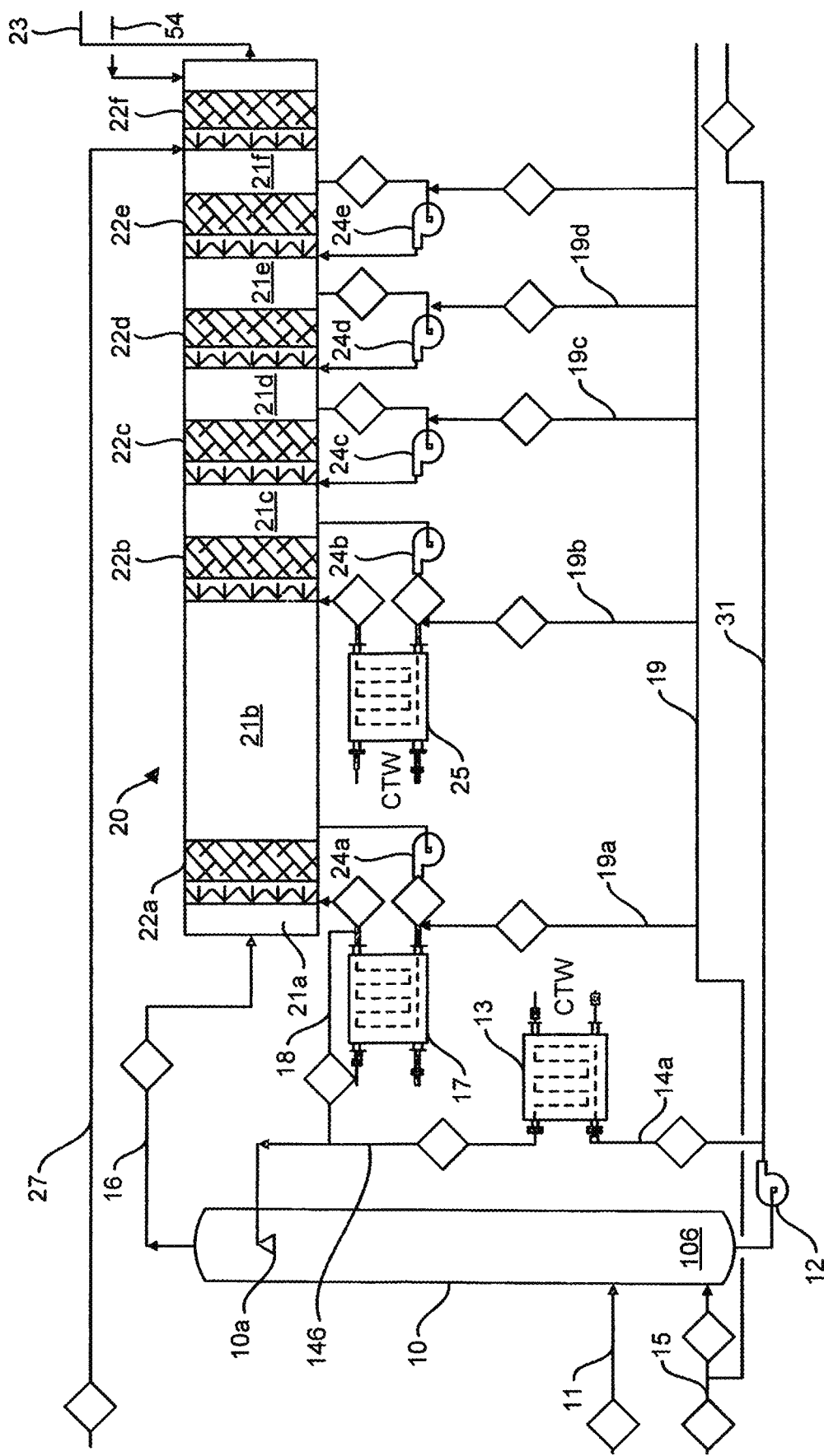
FIG. 1A depicts a front end of an exemplary chemical processing plant or facility that receives a sulfur dioxide gas stream in a first vessel or tower and that scrubs the gas in a series of horizontal scrubber sections.
Figure 1B:
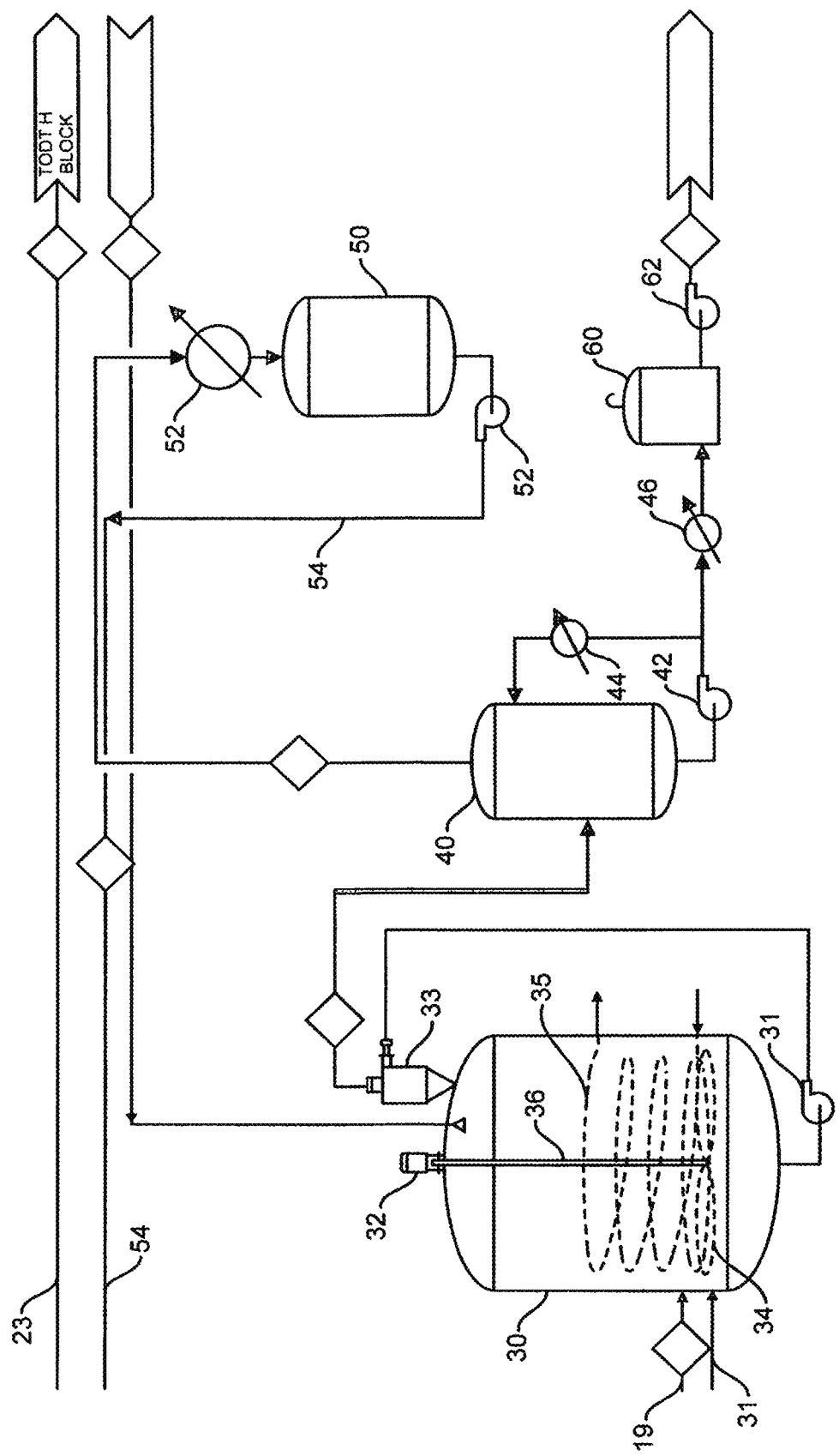
FIG. 1B shows the back end of the processing plant or facility of FIG. 1A including a reaction vessel for producing a substance such as a thiosulfate of potassium and, in addition, a number of plant control elements to help control concentration of the thiosulfate solution as well as other components of the processing plant.

FIGS. 1A and 1B show an exemplary plant layout of a crossflow scrubber according to as aspect of the present invention. The illustrated embodiment is designed to produce a liquid-based potassium thiosulfate. Principal components of the plant or facility include a primary vessel 10 that receives a source of $SO_2$ gas, a multistage crossflow scrubber 20 having gravity-fed circulatory pumps in respective stages thereof, a reaction vessel 30 for converting a sulfite/bisulfite solution from primary vessel 10 into a thiosulfate solution, an evaporator 40 to control concentration of the thiosulfate solution, a condensation tank 50 that supplies water as needed to various parts of the plant or facility, and a day tank 60 for storing the thiosulfate solution. The circulating water-based solution may be potassium sulfite ($K_2SO_3$) and/or potassium bisulfite ($KHSO_3$) if producing potassium thiosulfate ($K_2S_2O_3$) as a fertilizer.

In operation, $SO_2$ gas streaming from a source enters primary vessel 10 via conduit 11 where the gas is absorbed by and/or reacted with the liquid solution of potassium sulfite and/or potassium bisulfite circulated through vessel 10 via spray nozzles 10a and circulation pump 12. In this primary stage, vessel 10 converts about 70-90% of $SO_2$ gas into a sulfite/bisulfite mixture with some sulfates depending on the pH and oxygen concentration of incoming gas. Advantageously, vessel 10 contains no packing or other elements requiring cleaning or maintenance. Spray nozzles 10a, however, require periodic maintenance. Vessel 10 also removes heat and condenses some water. During circulation of the sulfite/bisulfite solution in vessel 10, a cation such as potassium hydroxide may be added to vessel 10 via conduit 15 in order to increase the concentration of the solution, which settles in a sump 10b located at a lower portion of vessel 10. The cation helps control pH of the sulfite/bisulfite solution circulating in vessel 10. Gravity fed pump 12 circulates the cation and sulfite/bisulfite solution from sump 10b of vessel 10 via conduit 14a and returns the liquid solution to an upper portion of vessel 10 via conduit 14b where nozzles 10a spray the liquid against the direction of gas flow in vessel 10 to absorb and react with incoming $SO_2$ gas. As the liquid falls through vessel 10, it absorbs heat and reacts with the upflowing $SO_2$ gas stream to convert some of the gas to potassium sulfite/potassium bisulfite when producing potassium thiosulfate ($K_2S_2O_3$) as an end product. Spray nozzles 10a or other liquid dispersion mechanisms need not necessarily spray liquid against the direction of gas flow, but instead, may disperse or spray the liquid in any direction relative to the direction of gas flow in vessel 10. Further, the addition of cation (e.g., potassium hydroxide) to vessel 10 at this point of operation does not produce any fertilizer product, e.g., potassium thiosulfate.

Heat exchanger 13 interposed between conduits 14a and 14b cools the circulating sulfite solution, which removes the heat from reaction, cation dilution and the hot $SO_2$ gas stream upflowing through vessel 10. The heat exchanger enables greater reaction efficiency and also may help cool the liquid to protect any plastic or other packing employed in subsequent stages of the crossflow scrubber. Cooling water is conventionally supplied and circulated through heat exchanger 13 to cool the circulating liquid solution, as needed. Automated temperature controls also may be implemented as known in the art. This enables attainment and maintenance of an optimum reaction temperature in vessel 10 for conversion of $SO_2$ gas into a sulfite/bisulfite of potassium.

Unreacted $SO_2$ gas exits an upper stack of vessel 10 via conduit 16 and continues through multiple stages of a crossflow scrubber 20. Pump 12 pumps a portion of the liquid containing sulfite/bisulfite mixture and absorbed/reacted $SO_2$ gas from primary vessel 10 to a downstream daytank that feeds reactor vessel 30. In a typical arrangement, the amount of liquid withdrawn by pump 12 and sent to a day tank that feeds reactor vessel 30 may range from less than 1% to 10%, more or less, of the liquid recirculated in vessel 10. Line 27 provides a freshwater feed to the crossflow scrubber 20 to replenish liquid drained from the primary vessel via pump 12 and/or to maintain a specific gravity of the liquid between 1.25 and 1.45, more or less. Crossflow scrubber 20 converts unreacted $SO_2$ gas into the sulfite/bisulfite solution. Scrubber 20 is partitioned into multiple stages so that greater conversion occurs in a first stage 21a thereof by reducing the concentration of $SO_2$ in the gas as it flows to the next stage 21b and towards to final stage 21f of the scrubber. At the final stage 21f, any unreacted $SO_2$ gas leaving scrubber 20 will have low enough levels of $SO_2$ to emit directly to the atmosphere through a vent stack connected to conduit 23. The final stage 21f of the scrubber also functions as a mist eliminator for the vented gas stream.

Initially, the unreacted $SO_2$ gas enters a first stage 21a of the multi-section crossflow scrubber 20 and proceeds through a series of gas contacting media, such as packing 22a, 22b, 22c, 22d, 22e and 22f that facilitate the absorption/reaction process. A gravity-fed pump 24a of the first stage recirculates a certain amount of liquid sulfite solution from a sump of stage 21a back to the packings 22a of stage 21a so as to further scrub unreacted $SO_2$ gas. At the same time, a cation such as potassium hydroxide is supplied to the recirculating liquid in an amount to maintain a pH range in primary vessel 10 of 3.0 to 6.0, more or less. A portion of the liquid returning to stage 21a is routed back to the spray nozzles 10a of primary vessel 10 via conduit 18, which couples to conduit 14b. Heat exchanger 17 cools the circulating liquid to maintain a temperature below a critical level in order to protect the plastic or other temperature-sensitive packing 22a of the first stage 21a of the multi-section crossflow scrubber. Cooling water is conventionally supplied to heat exchanger 17 as known in the art. Instead of providing plastic or other temperature-sensitive packing as a gas contacting media, the packing may comprise a stainless steel or high-temperature plastic material. Moreover, the gas contacting media need not comprise a solid material but simply may comprise liquid mist or droplets of the circulating fluid that are momentarily suspended or flowing through the confines of scrubber 20. In this case, spray nozzles may also be deployed in various sections of multi-section crossflow scrubber 20.

Unreacted $SO_2$ gas in scrubber stage 21b passes to scrubber stage 21c through packing 22b of scrubber 21b, which also has a sump at a lower section thereof. Gravity-fed pump 24b recirculates liquid from sump of stage 21b back to packing 22b. The return circulation path of the liquid passes through a heat exchanger 25, which receives cooling tower water in order to cool the recirculating liquid. By the time the liquid reaches the second stage 22b of the crossflow scrubber, the liquid is sufficiently cooled below the plastic packing damage temperature so that the later stages do not require heat exchangers for further cooling. During recirculation of the liquid from the output of the second stage 21b to the input of the first stage 21a, a cation such as potassium hydroxide may also be added via conduit 19b to control pH of the circulating sulfite and bisulfite solution. This process is successively repeated until unreacted $SO_2$ gas reaches the final stage and vents to the atmosphere. Each scrubber stage 21a, 21b, 21c, 21d and 21e successively scrubs the unreacted $SO_2$ gas as it flows from one stage to a next stage thereby lowering its concentration at each stage.

The multi-section, multistage crossflow arrangement advantageously provides more convenient ground-level plant maintenance and, in addition, the number of stages in the crossflow scrubber also may be chosen or utilized to meet any $SO_2$ emission or scrubbing requirement. The number of stages or sections in the crossflow scrubber may range from a couple of stages to more than a few stages but three to five stages are adequate for the illustrated embodiment.

The sulfite or bisulfite solution of sump stage 21a (and/or other stages) may be automatically monitored by instrumentation for pH and specific-gravity and forwarded to the primary vessel 10. Specific gravity may be controlled by adding water and pH is controlled by adding a cation.

The sulfite/bisulfite solution is then forwarded to continuously stirred reactor 30 via conduit 31 where it is reacted with additional potassium hydroxide (KOH) to produce potassium thiosulfate. Sulfur may also be added. Motor 32 drives impellers 34 through a shaft 36 to provide continuous stirring of vessel contents.

Sulfite/bisulfite solution from a day tank is fed to continuously stirred reaction vessel 30 along with molten sulfur and a cation to produce the thiosulfate. In one embodiment, potassium hydroxide (KOH) plus additional sulfur is added to the reaction vessel 30 to produce potassium thiosulfate. A heat transfer coil 35 submersed in the stirred liquid maintains a desired reaction temperature and functions to remove heat of reaction and/or the heat of dilution of cation. During production, the reaction temperature in vessel 30 is selected for optimum reaction. Pump 31 recirculates the liquid contents of the reaction vessel 30 through a hydroclone 33, which captures sulfur particles and returns them to the vessel. Liquid overflow of hydroclone 33 is the discharge point of the liquid from the reactor to extract a thiosulfate of potassium. The extracted thiosulfate is sent to an evaporator vessel 40 to remove excess water if necessary to strengthen the final product to a desired concentration, typically a specific gravity of around 1.46 and a pH of about 7.0 to 9.0 for potassium thiosulfate. A water tank 50 receives water vapor from evaporator vessel 40 via a condenser 52, which drains condensed water into water tank 50. Via conduit 54, pump 52 sends water from tank 50 back to various part of the scrubber 20, as needed, or to other water consuming equipment in the plant or facility. Pump 42 recirculates the thiosulfate mixture to maintain homogeneity of the solution. During such circulation, evaporator 42 removes excess water from the thiosulfate solution, as desired.

Pump 42 also feeds the thiosulfate solution to day tank 60. This solution is cooled, as necessary, by a cooler 46 before being pumped to day tank 60. Day tank 60 provides temporary storage of the thiosulfate product. Samples from day tank 60 are used to check the concentration of the thiosulfate product made in reactor 30 after it has been cooled. When the thiosulfate solution attains desired properties, a pump 62 transfers the solution to permanent product storage.

The illustrated facility may also take on other forms or configurations. For example, the multi-section crossflow scrubber may comprise a single partitioned vessel or it may comprise multiple separate vessels interconnected by conduits, piping or passages. The number of stages may vary from a couple of stages to more than a few stages depending on the extent of scrubbing required and/or the type of gas being scrubbed as well as legally required discharge tolerances for pollution control. The primary vessel may stand alone as a separate and independent vessel or tower, or it may be configured as part of the crossflow scrubber. Pumps may be ganged with common drive motors and relative positions of various sections and stages may be rearranged via conduits and piping to achieve the same or similar results. Temperature, pH and density control may be implemented at points in the plant other than the locations shown or described herein. Fluid recirculation may occur between contiguous or noncontiguous stages of the multi-section vessel. Gas contacting material disposed at any one of the stages of the multi-section vessel, if used, may take on many forms such as metal, high-temperature plastic or conventional plastic. Fluid may be extracted or withdrawn at any point of the facility and fed to the reaction vessel to produce a product. Water may be added or extracted/condensed at any liquid fluid circulation point of the plant or facility in order to control specific gravity of the circulating fluid. Fluid may comprise a gas, i.e., a scrubbing gas or scrubbing substance, other than the gas being scrubbed. Scrubbing mechanisms may be disposed at each stage or only at some stages of the multi-section vessel.

Internal workings of the scrubbing mechanisms may also depart from the illustrated embodiment. The scrubbing mechanism may or may not include a packing material. In some cases, it may only be necessary to provide spray nozzles or other devices in the scrubber stages of the multi-section scrubber to successively and sufficiently scrub the gas. Thus, the gas contacting media may simply comprise fluid mist or droplets suspended or flowing in gas within the confines of the vessel. The above variations apply to both method and apparatus aspects of the invention.

Accordingly, the inventions defined by the appended claims embrace the above and other modifications and adaptations that may come to a person skilled in the art based on the teachings herein.

We claim:

1. A method of efficiently scrubbing unwanted $SO_2$ from a streaming gas source before venting to atmosphere while also producing potassium thiosulfate ($K_2S_2O_3$), said method comprising:
   (a) supplying the streaming gas source to a primary vessel;
   (b) circulating a liquid solution within the primary vessel in order to react with and partially scrub $SO_2$ gas from the streaming gas source wherein the liquid solution includes at least one of potassium sulfite (K2SO3) and potassium bisulfite ($KHSO_3$);
   (c) providing a multistage crossflow scrubber downstream of said primary vessel, said crossflow scrubber comprising serially arranged scrubbing mechanisms at respective stages thereof that successively scrub unreacted $SO_2$ gas from the streaming gas source, said crossflow scrubber being operative by:
      (i) receiving and partially scrubbing at a first stage thereof $SO_2$ gas from streaming gas source emanating from the primary vessel,
      (ii) forwarding the streaming gas source containing unreacted $SO_2$ gas from the first stage to a second succeeding stage, and repeating this process from a preceding stage to a succeeding stage of the crossflow scrubber,
      (iii) circulating said liquid solution within the stages to further scrub the streaming gas source of unwanted $SO_2$ gas, and
      (iv) venting to the atmosphere the streaming gas source substantially free of $SO_2$ gas from a final stage of the crossflow scrubber,
   (d) cascading at least a portion of liquid solution circulating in stages of the crossflow scrubber from a succeeding stage to a preceding stage and optionally cascading at least a portion of the liquid solution back to the primary vessel for further scrubbing the streaming gas source of unwanted $SO_2$ gas; and
   (e) transferring at least a portion of the circulating liquid solution to a reaction vessel along with potassium hydroxide (KOH) in order to produce potassium thiosulfate ($K_2S_2O_3$) in said reaction vessel.

2. The method of claim 1, wherein the crossflow scrubber includes at least three stages.

3. The method of claim 1, wherein in said circulating step comprises facilitating reaction between $SO_2$ gas and the liquid solution utilizing a gas contacting media within respective stages of the crossflow scrubber.

4. The method of claim 1, further comprising supplying a cation to the liquid solution to control pH during circulation of said liquid solution.

5. The method of claim 1, further comprising adding water to the liquid solution to control or maintain specific gravity of the liquid solution.

6. The method of claim 1, wherein said transferring step includes transferring sulfur along with said potassium hydroxide (KOH) to said reaction vessel.

7. The method of claim 4, wherein the cation of the supplying step comprises at least one of potassium hydroxide, sodium hydroxide and sodium carbonate to make sodium bisulfite.

8. The method of claim 1, wherein said crossflow scrubber includes a gas contacting media comprising a packing material.

9. The method of claim 1, further including condensing or adding water to the liquid solution during circulation in order to control specific gravity thereof.

10. The method of claim 1, further comprising controlling temperature of the liquid solution during circulation in order to increase efficiency of reaction.

11. The method of claim 1, further comprising controlling temperature of the liquid solution during circulation in order to protect temperature-sensitive elements.

12. The method of claim 1, further comprising controlling pH during the circulation of the liquid solution.

13. The method of claim 1, further comprising venting unreacted $SO_2$ gas from the multi-section scrubber to atmosphere at an $SO_2$ level below a maximum allowable limit.

14. The method of claim 1, wherein further including continuously stirring the liquid solution in the reaction vessel to maintain homogeneity of the liquid solution contained therein.

15. The method of claim 1, further including controlling temperature of the liquid solution in said reaction vessel from about 125 to 250 degrees Fahrenheit in order to control reaction within the liquid solution.

16. A method of wet-scrubbing unwanted $SO_2$ from a streaming gas source before atmospheric venting wherein the scrubbing liquid includes potassium sulfite (K2SO3) and/or potassium bisulfite ($KHSO_3$), said method comprising:

cascading forward said streaming gas source through multiple stages of a multistage wet scrubber while cascading backward said scrubbing liquid through the multiple stages of said multistage wet scrubber, and extracting a portion of said scrubbing liquid from said multistage wet scrubber to produce potassium thiosulfate resulting from a reaction between $SO_2$ and the scrubbing liquid.

17. The method of claim 16, further comprising:

controlling the pH and specific gravity of said scrubbing liquid by adding a cation and/or water to the scrubbing liquid during circulation of said scrubbing liquid through the multistage wet scrubber.

18. The method of claim 16, further comprising:

providing a reaction vessel in which to produce the potassium thiosulfate, and adding sulfur along with potassium hydroxide (KOH) to said reaction vessel to produce said potassium thiosulfate.

19. The method of claim 16, wherein the streaming gas source emanates from a wet scrubbing tower that partially removes $SO_2$ from the streaming gas source.

20. A method of wet-scrubbing unwanted $SO_2$ from streaming waste gas before atmospheric venting wherein the scrubbing liquid includes potassium sulfite (K2SO3) and/or potassium bisulfite ($KHSO_3$), said method comprising:

streaming the waste gas forward through respective stages of a multistage wet scrubber while reversing the flow of scrubbing liquid through said respective stages of said multistage wet scrubber, and extracting a portion of the scrubbing liquid from the multistage wet scrubber in order to produce potassium thiosulfate (K2S2O3) resulting from a reaction between the scrubbing liquid and the unwanted $SO_2$.

* * * * *